Figure 1:
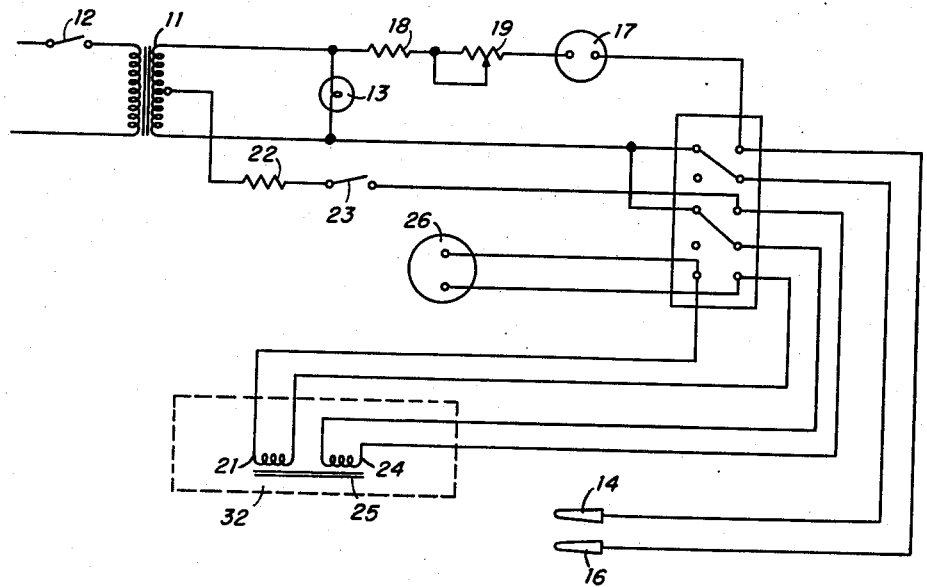

June 9, 1959

A. M. HUEHN ET AL 2,890,407

ARMATURE TESTING DEVICE

Filed Nov. 29, 1955

3 Sheets-Sheet 1

INVENTORS
ARTHUR M. HUEHN
ELMER C. EVANS
BY

*George E. Pearson*

ATTORNEYS

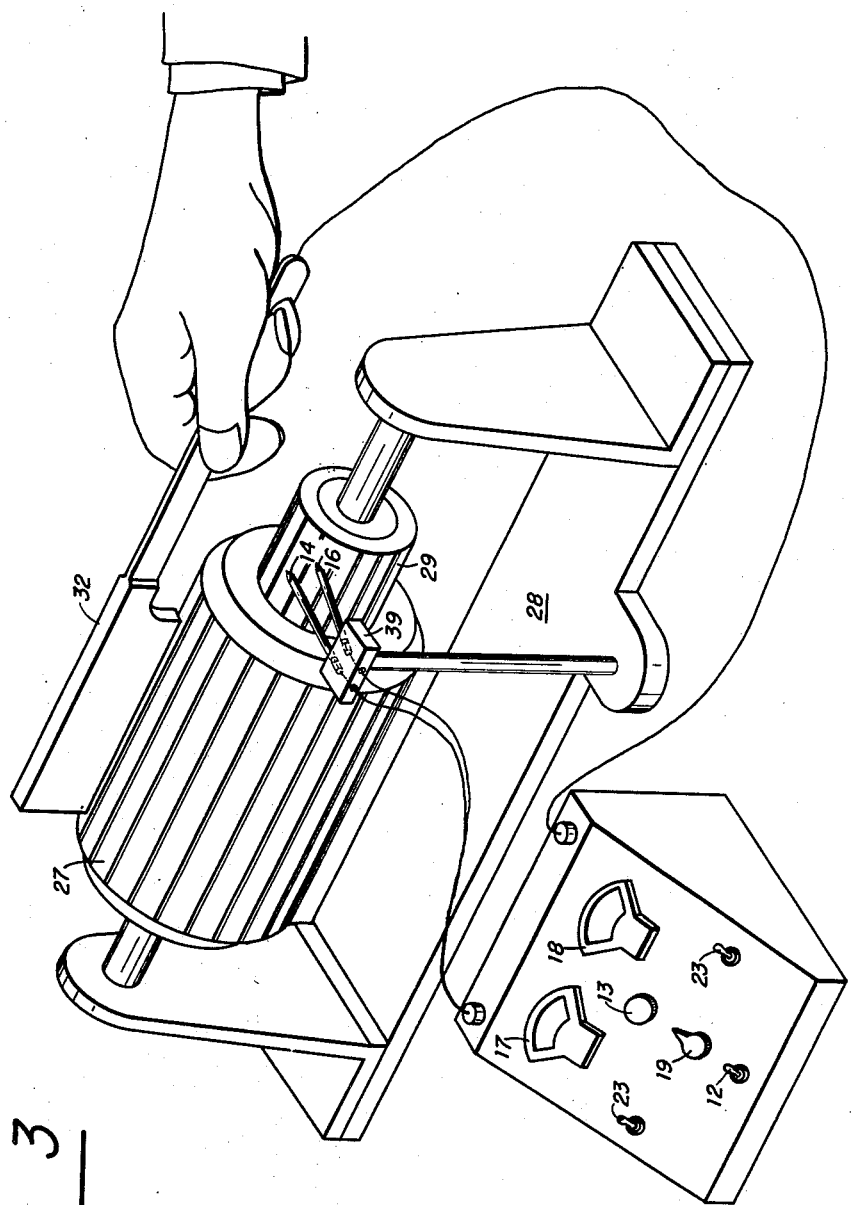

June 9, 1959

A. M. HUEHN ET AL 2,890,407

ARMATURE TESTING DEVICE

Filed Nov. 29, 1955

3 Sheets-Sheet 3

INVENTORS
ARTHUR M. HUEHN
ELMER C. EVANS
BY

ATTORNEYS

United States Patent Office 2,890,407
Patented June 9, 1959

2,890,407
ARMATURE TESTING DEVICE

Arthur M. Huehn, Chula Vista, and Elmer C. Evans, National City, Calif.

Application November 29, 1955, Serial No. 549,896

3 Claims. (Cl. 324—51)

(Granted under Title 35, U.S. Code (1952), sec. 266)

The invention described herein may be manufactured and used by or for the Government of the United States of America for governmental purposes without the payment of any royalties thereon or therefor.

This invention relates to induction analyzers and more particularly to an armature testing and data finding instrument for use in the repair, maintenance, redesign, checking and testing of electrical rotating machinery.

The induction analyzer comprising this invention consists essentially of a low reading voltmeter and ammeter and input transformer, supply switch, control switch, fixed and variable resistance, chassis housing, and simple circuitry including flexible clip leads. Two of these leads are for supply of test voltages to the loops in the armature and the other two provide a circuit for the test wand. The test wand may be a single or dual wound induction coil which serves as a probe that receives induced signals and interprets them in the meter reading. The analyzer provides a quick, reliable method of checking all data such as coil pitch, coil span, commutator pitch, erection of winding, coil groupings, coil or group sequence, and type of winding for all standard armatures and stators and can readily be set up for a special type. It quickly indicates the presence of shorts, grounds, broken wires, reversed coils or coil groups and can take accurate data from such badly damaged equipment that none of the older methods or equipment could be used. Due to the simplicity, convenience of operation, and versatility of the induction analyzer, it not only is superior to other checking equipment, both in accuracy and speed, but it limits the necessity of such diversified units as growlers, numerous test meters, bar-to-bar test equipment, power stats, voltage dividers, batteries, rectifiers, compasses, and various units for supplying and converting D.-C. and single and polyphase A.-C. In using this equipment, the operator need no longer remember a vast number of formulas, methods and procedures. With the exception of a 110 volt A.-C. power supply, this equipment is entirely self-contained and ready for instant use.

It is, therefore, an object of this invention to provide for an improved induction analyzer for taking data from armatures and the like.

Another object is the provision of a simple, versatile analyzer for determining data which is convenient in operation and has a high degree of speed and accuracy.

A further object is the provision of an induction analyzer which will replace diversified units due to its versatility, yet is simple in design and convenient in operation.

Figure 2:
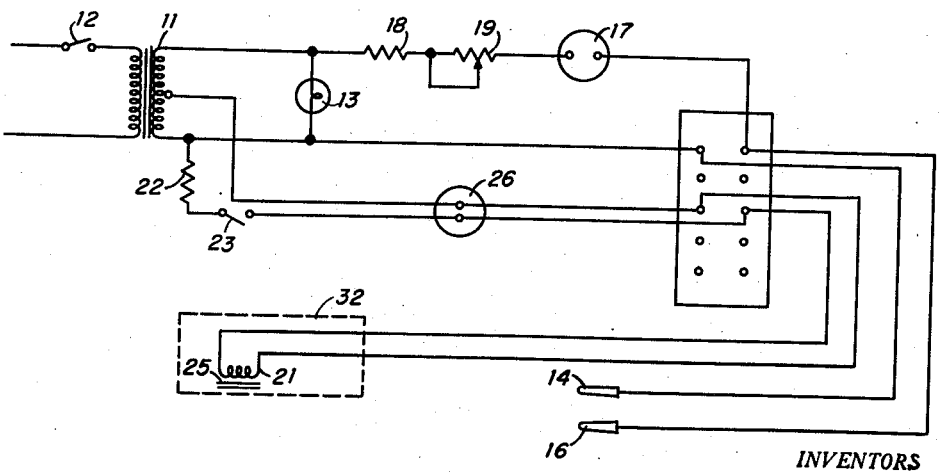

Other objects and many of the atendant advantages of this invention will be readily appreciated as the same becomes better understood by reference to the following detailed description when considered in connection with the accompanying drawings wherein:

Fig. 1 is a schematic drawing of the circuitry;
Fig. 2 is a modified circuit design;
Fig. 3 is a pictorial view of the instrument and an armature under test; and
Figs. 4, 5, 6, and 7 represent combinations of progressive, retrogressive wave and lap armature windings.

Referring now to Fig. 1, the primary winding of transformer 11 may be connected to a 60 cycle A.-C. voltage source. 12 is a conventional on-off switch. Connected across the secondary windings is indicator lamp 13 to visually indicate the operativeness of the instrument. To each end of the secondary winding is connected contact leads 14, 16. In series with one of the leads is connected an ammeter 17, a current limiting resistor 18, and a variable resistor 19 used for sensitivity control. This portion of the circuitry shown in Fig. 1 is used to check continuity and to determine which of the armature bars form terminals for a single coil winding. Between the center tap on the secondary winding of transformer 11 and one end thereof is connected a polarity checking coil 24 of approximately 500 turns. The voltage pickup coil 21 is mounted in a small movable probe or wand 32 in proximity with the polarity checking coil 24 and has approximately 3000 turns. An iron core 25 increases the sensitivity of the pickup coil 21. A voltage dropping resistor 22 and a polarity checking switch 23 is connected in series with polarity checking coil 24. A coil, capacitor or other voltage dropping means may be used instead of resistance 22. The pickup coil 21 is connected to a volt meter 26 which reads the current induced in the coil 21 when placed over the slot containing the energized loop. The pickup coil 21 may be shielded from the strong adjacent field which may be present by means of a shield with a ground strap attached which is made to slip over the pickup head. This may be done when only the loop directly under the pickup is to be analyzed.

As shown in Fig. 3, an armature 27 under test is placed in a standard armature mount 28 with the commutator 29 on the right and the contact fingers 14, 16 adjusted to contact adjoining bars on the armature commutator. These two leads are connected to the contact assembly 31 and are color coded with red and black so that phase relations may be maintained in certain aspects of the test or data findings.

Figure 5:
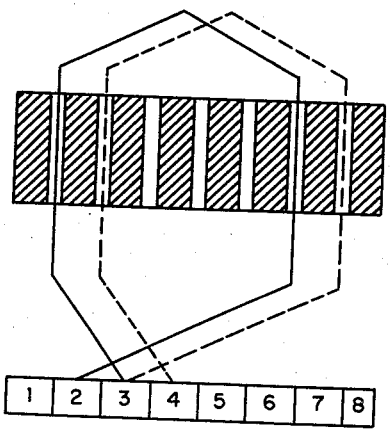
Figure 4:
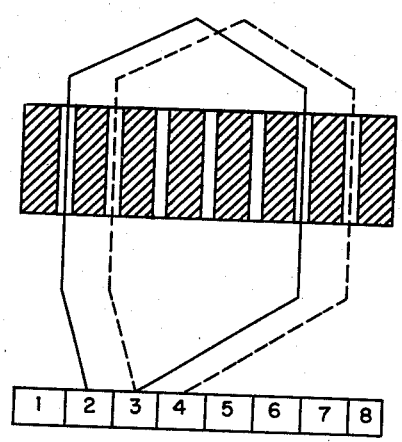
Figure 6:
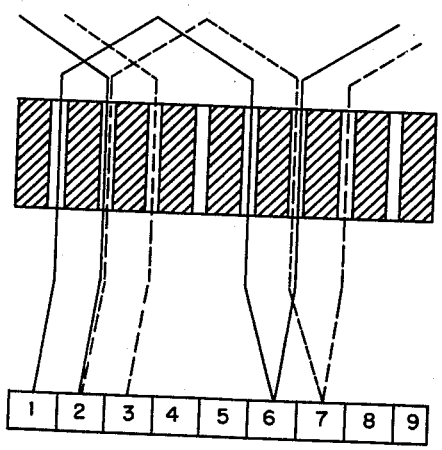
Figure 7:
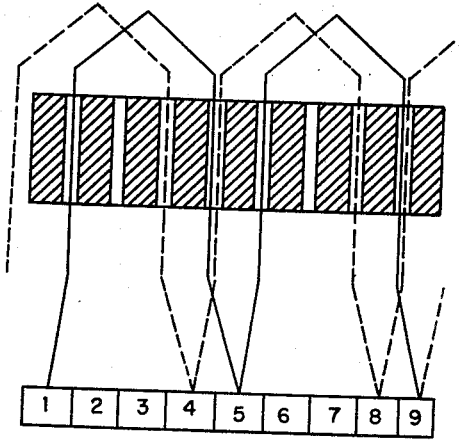

Fig. 4 shows a progressive lap wound coil with one winding extending from 2 on the commutator bar through slots 1 and 6 of the armature and back to bar 3. If our contacts 14, 16 are connected with bars 2 and 3, a completed circuit is made and a reading may be observed on ammeter 17. Wand 32 is passed over every slot in the armature and since a maximum voltage can be observed over only two slots with voltmeter 26, we know that it is lap wound. Such finding is duly recorded. by marking the slots and the bars we now have the exact placement of the coils in the lap wound armature. A current passing through this coil in the armature energizes pickup coil 21 when placed in proximity thereto and induces a voltage reading on 26 to obtain a maximum reading. If four maximum readings were observed around the armature, the armature would be a wave wound armature such as shown in Figs. 6 and 7. If switch 23, normally open, is closed, polarity checking coil 24 is energized from the secondary of transformer 11 in phase with the voltage applied to contacts 14 and 16 and consequently the armature coil. To determine whether the coil is progressive wound as in Fig. 4 or retrogressive wound as in Fig. 5, it is necessary to make a polarity check. Since it is necessary to have the pickup coil 21 over the same slot or coil side in making the polarity check, we arbitrarily and consistently place the pickup coil over the left hand slot, that is, slot 1 of the coil. The left hand slot of the coil is identified as the left hand side in looking from the commutator end of the armature. When switch 23 is closed, polarity checking coil 24 is energized in a manner so as to either add or subtract from the voltage induced from the armature coil into the pickup coil 21. This is due to the transformer action due to the proximity of coils 21 and 24. If the voltage from coil 24 adds to the voltage induced from the armature coil, an increased voltage is read in voltmeter 26. This is interpreted as a progressive winding and is thus duly recorded. If the voltage subtracts, a smaller voltage is observed in 26 and the winding is considered a retrogressive winding as shown in Fig. 5. This information is useful in tearing down an armature for repair and also for testing a repaired armature coil.

The test and checking of an armature which is wave wound as shown in Figs. 6 and 7 is functionally the same as that for the lap wound armature. When contacts 14 and 16 are connected to bars 1 and 2, energization of the complete coil is effected. Then if the contact touching 2 were moved around to contact 5, then the first half of the loop is energized and tests can be conducted on this half as if it were a lap wound winding. Then the contact connected to 1 is moved to contact bar 5 and the contact formerly contacting bar 5 is moved around to the next maximum voltage reading. This would be on bar 1 but since that would be merely a reversal of contacts from the previous readings, the contact on bar 1 is then moved again to the right until it contacts bar 2 where the second half of the coil completes the circuit and is thus energized. It should be noted that in a progressive wound wave type winding, the fourth side of the double coil overlaps or crosses over the first side of the coil as shown in Fig. 6, whereas in Fig. 7, where the coil is a wave retrogressive winding, the fourth side does not cross over the first but instead lags one bar behind. Expressed in another manner, if the fourth side of the winding is on the left side of the first side, it is a retrogressive winding. If it crosses over and is on the right of the first side, it is a progressive winding.

The modified circuitry of Fig. 2 differs from that shown in Fig. 1 in that the voltmeter 26 is connected across the pickup coil 21 in the wand 32 and also across a portion of the secondary winding of transformer 11. Here again polarity checking switch 23 is normally open with the voltage reading on the voltmeter 26 induced by voltage in the pickup coil 21 when in proximity with the energized armature coil connected to the contacts 14 and 16. Here again when the switch is closed the voltage from the transformer 11 either adds or subtracts from the voltage induced into the pickup coil 21. If it adds, the two voltages are in phase and the windings are progressive. If the two oppose and the voltage is subtracted, a retrogressive winding is indicated.

The armature can now be speedily stripped and by counting the conductors in but one slot and checking the wire size a complete and accurate recording of the armature data necessary for rewinding is attained.

Utilizing the present method and apparatus it is possible to record armature data in a few minutes that required up to several hours by the systems previously used. This is especially true for armatures having dual or plural windings on a common drum, such as dynamotors, converters, multi-duty motors, etc. These units now require careful removal and recording of the top windings without damage to the lower windings so that they may also be recorded. Utilizing previous methods and apparatus of recording data slight errors are easily made which resulted in the motor or generator being rewound improperly. Consequently, there was loss in efficiency and more frequency burning out of the armature on a slight overload. These errors in rewinding would then be duplicated on the next rewinding resulting in the motor generator being discarded or rewound many times. Furthermore, where the data is recorded during the stripping process any damage or interchange of the lead positions will prevent the recording of complete and accurate data which will often necessitate obtaining the correct data from the manufacturer or designer, and in some instances this is impossible due to the age of the unit or to the obliteration or loss of the name plate on the machine. This results in long periods of delay in placing it back into service. Use of the present method and apparatus substantially precludes most possibilities of mistakes or inaccuracies due to the factor of human error in recording armature rewinding data. A variable frequency source may be used instead of transformer 11 with its 60 cycle voltage source. A variable frequency source increases the sensitivity of the device for very low resistance armatures or stators such as car generators, and has a very low current demand for the test due to the increased sensitivity and the better sensitivity control.

Obviously many modifications and variations of the present invention are possible in the light of the above teachings. It is therefore to be understood that within the scope of the appended claims the invention may be practiced otherwise than as specifically described.

What is claimed is:

1. A testing device for armatures which comprises a transformer having the terminals of its primary winding connected to an A.-C. voltage source and the terminals of its secondary winding connected to a pair of contacts for impressing a potential on selected armature coils, means for one of the terminals of the secondary to indicate that a voltage is being impressed on the armature coil, a polarity checking circuit connected to the secondary winding, a voltage pick up circuit including a coil and a voltmeter, said coil of the voltage pick up circuit being enclosed in a probe for movement by an operator relative to the armature coils for receiving induced voltage from the armature coils and indicating the induced voltage on the voltmeter, normally open switch means in the polarity checking circuit for selectively mixing voltage from the secondary with the induced voltage when the switch is closed to permit the operator to observe the voltmeter and determine whether the impressed and induced voltages are in or out of phase.

2. A testing device for armatures which comprises a transformer having the terminals of its primary winding connected to an A.-C. voltage source and the terminals of its secondary winding connected to a pair of contacts for impressing a potential on selected armature coils, means for one of the terminals of the secondary to indicate that a voltage is being impressed on the armature coils, a polarity checking circuit including a coil connected to the secondary winding, a voltage pick up circuit including another coil and a voltmeter, both said coils of the polarity checking circuit and the voltage pick up circuit being enclosed in a probe for movement by an operator relative to the armature coils for receiving induced voltage from the armature coils and indicating the induced voltage on the voltmeter, normally open switch means in the polarity checking circuit for selectively mixing voltage from the secondary with the induced voltage when the switch is closed to permit the operator to observe the voltmeter and determine whether the impressed and induced voltages are in or out of phase.

3. A testing device for armatures which comprises a transformer having the terminals of its primary winding connected to an A.-C. voltage source and the terminals of its secondary winding connected to a pair of contacts for impressing a potential on selected armature coils, means for one of the terminals of the secondary to indicate that a voltage is being impressed on the armature coils, a voltage pick up circuit including a coil and a voltmeter, a polarity checking circuit connecting the secondary with said voltmeter, said coil of the voltage pick up circuit being enclosed in a probe for movement by an operator relative to the armature coils for receiving induced voltage from the armature coils and indicating the induced voltage on the voltmeter, normally open switch means in the polarity checking circuit for selectively mixing voltage from the secondary with the induced voltage when the switch is closed to permit an operator to observe the voltmeter and determine whether the impressed and induced voltages are in or out of phase.

References Cited in the file of this patent

UNITED STATES PATENTS

| | | |
|---|---|---|
| 1,792,320 | Peters et al. | Feb. 10, 1931 |
| 2,599,960 | Weichsel | June 10, 1952 |

FOREIGN PATENTS

| | | |
|---|---|---|
| 354,061 | Germany | May 31, 1922 |
| 607,942 | Germany | Jan. 11, 1935 |